United States Patent [19]

Townsend et al.

[11] Patent Number: 5,323,423

[45] Date of Patent: Jun. 21, 1994

[54] RECEIVE SIDE PULSE WIDTH CONTROLLED ADAPTIVE EQUALIZER

[75] Inventors: Jeffrey A. Townsend, Orange; Joseph R. Yudichak, Madison, both of Conn.

[73] Assignee: TranSwitch Corporation, Shelton, Conn.

[21] Appl. No.: 25,072

[22] Filed: Mar. 2, 1993

[51] Int. Cl.$^5$ ............................................. H04B 3/20
[52] U.S. Cl. ..................................... 375/14; 375/98; 333/18
[58] Field of Search ........................ 375/11, 12, 14, 22, 375/98; 370/32.1; 333/18; 328/111; 379/394, 398, 406, 410, 411

[56] References Cited

U.S. PATENT DOCUMENTS

| | | | |
|---|---|---|---|
| 3,755,736 | 8/1973 | Kaneko et al. | 375/12 |
| 3,781,720 | 12/1973 | Mueller | 375/14 |
| 4,707,840 | 11/1987 | Nakayama | 375/98 |

OTHER PUBLICATIONS

"A New Family of Active Variable Equalizers" by Cordell, IEEE Transaction on Circuits and Systems, vol. CAS-29, No. 5, May 1982, pp. 316-322.

"Inductorless Variable Equalizers" by Brglez, IEEE Transactions on Circuits and Systems, vol. CAS-22, No. 5, May 1975, pp. 415-418.

"Variable Equalizer with Differential Amplifiers" by Shida et al. IEEE Transactioins on Circuits and Systems, vol. CAS-24, No. 6, Jun. 1977, pp. 318-320.

*Primary Examiner*—Stephen Chin
*Assistant Examiner*—Kevin Kim
*Attorney, Agent, or Firm*—David P. Gordon

[57] ABSTRACT

Pulse width controlled adaptive equalizers are provided for telecommunication signals which are routed over coaxial cables. The adaptive equalizers operate on the premise that a coaxial cable degrades a telecommunications signal by widening the pulse of the signal and decreasing the amplitude. The longer the cable is, the wider the pulse gets. Thus, by detecting the width of the pulse against a desired width, and feeding back the difference to a variable filter which can correct the pulse width, a pulse width controlled adaptive equalizer can be provided. The preferred pulse width controlled adaptive equalizer includes: a variable filter block for filtering input signals to provide frequency dependent gain based on the amplitude of a control signal; a comparator block for comparing the filtered bipolar signal against a reference value based on the peak amplitude of the signal to provide a pulsed output; a pulse width detector which senses the pulse width of the pulsed output and outputs a signal indicative of the pulse width; and a feedback filter which filters the signal indicative of the pulse width and provides a control signal to the variable filter in order to control the frequency dependent gain of the filter.

19 Claims, 4 Drawing Sheets

FIG. 6

RECEIVE SIDE PULSE WIDTH CONTROLLED ADAPTIVE EQUALIZER

BACKGROUND OF THE INVENTION

This invention relates generally to adaptive equalizers. More particularly, this invention relates to a pulse width controlled adaptive equalizer. The pulse width controlled adaptive equalizer of the invention is not limited to, but finds particular use in the receiver section of a coaxial cable line interface device which recovers and transmits DS3 and STS-1 telecommunication signals.

DS3 and STS-1 telecommunication signals are governed by standards which require that the signals be transmitted at certain amplitudes or power. Typically, the standards suggest that the signal be transmitted at a particular power ±3.5 dB. Effectively, then, a 7 dB range is possible. Additionally, in a "bridging mode", an additional attenuation of 20 dB is typical. Further, where the DS3 or STS-1 signal is being transmitted in a central office or the like by coaxial cables of up to four hundred fifty feet in length, an additional attenuation of up to 6 dB may be experienced. While the bridging mode attenuation is not frequency dependent, and the power range of the DS3 or STS-1 signals has only a small frequency dependence, the attenuation due to the coaxial cable is known to be strongly frequency dependent according to a root-f ($\sqrt{f}$) function. Thus, in correcting for gain, it is important to know the extent to which the low amplitude of the received signal is due to the original power of the signal sent and the extent to which it is due to attenuation in the coaxial cable. Standard equalizers which use the signal amplitude for equalization ignore the distinction of the types of attenuation, and either must accommodate for the frequency dependence of the attenuation in other manners, or suffer from poor results.

An addition to providing an amplitude independent means of equalization, ideally, a pulse width controlled output set to one-half the period of the system frequency is generated. This equalized pulse width controlled output can then be used as an input to a pulse-width sensitive phase detector which is typically used in a phase locked loop clock recovery circuit for telecommunication signals. Since the prior art amplitude sensing adaptive equalizers do not control the output pulse widths of their recovered data signals, the jitter performance of clock recovery circuits used with these equalizers is degraded by non-ideal centering of the recovered clock with respect to the received data pulses.

SUMMARY OF THE INVENTION

It is therefore an object of the invention to provide an adaptive equalizer which produces a transfer function which is the inverse of the frequency dependent loss of the coaxial cable through which the received signal is driven.

It is a further object of the invention to provide an adaptive equalizer which allows a wide variation in input signal amplitude by utilizing the pulse width as a control.

It is another object of the invention to provide a pulse width controlled adaptive equalizer for DS3 and STS-1 telecommunication signals which have been received through a coaxial cable.

It is an additional object of the invention to provide a pulse width controlled adaptive equalizer which may be used in conjunction with an automatic gain control (AGC) amplifier for the retransmission of telecommunication signals.

A further object of the invention is to provide a pulse width controlled adaptive filter which includes amplitude offset circuitry to provide a proper amplitude while equalizing for frequency dependent attenuation.

Yet another object of the invention is to provide an adaptive equilizer for telecommunication signals which not only allows a wide variation in input signal amplitude by utilizing the pulse width as a control, but provides an equalized output pulse having a width which is one-half the period of the system frequency.

In accord with the objects of the invention, a pulse width controlled adaptive equalizer is provided which operates on the premise that a coaxial cable degrades a telecommunications signal by widening the pulse of the signal and decreasing the amplitude. The longer the cable is, the wider the pulse gets. Thus, by detecting the width of the pulse against a desired width, and feeding back the difference to a variable filter which can correct the pulse width, a pulse width controlled adaptive equalizer can be provided. In accord with this premise, the pulse width controlled adaptive equalizer of the invention broadly comprises: a variable filter means for receiving a bipolar input signal, for filtering the input signal to provide frequency dependent gain based on the amplitude of a control signal, and for outputting a filtered bipolar signal; comparator means for comparing the filtered bipolar signal against a reference value (e.g., one-half the peak amplitude of the signal) to provide a pulsed output; a pulse width detector which senses the pulse width of the pulsed output and outputs a signal indicative of the pulse width; and a feedback filter which filters the signal indicative of the pulse width and provides a control signal to the variable filter in order to control the frequency dependent gain of the filter. Preferably, the variable filter means includes two variable filters, each of which provides an output, where the two outputs constitute negative and positive representations of the filtered bipolar signal. Also, the comparator means preferably comprises a peak detector and two comparators which compare one-half the peak values detected by the peak detector against the outputs of the variable filters. The output of one of the comparators is sent to a delay circuit, and to the pulse width detector, and the output of the delay circuit is also used by the the pulse width detector to generate the signal indicative of the pulse width. The signal indicative of the pulse width preferably includes a first signal indicating that the pulse width is too wide, and a second signal indicating that the pulse width is too narrow. These signals are sent to an integrator, preferably in the form of a charge pump, which comprises the feedback filter. The charge pump functions to provide voltages at its outputs which are based on the first and second signals indicating whether the pulse width is too narrow or wide.

According to a preferred aspect of the invention, each variable filter includes a circuit having an impedance which is partially controlled by the feedback control which is a function of pulse width, and which is at least partially a function of frequency when the pulse width is not ideal (i.e., when degradation is present due to transfer over a coaxial cable). In particular, the gain of the variable filter is designed to be approximately the ratio of two resistor values, R2/R1, when the incoming signal is well formed (i.e., the coaxial cable is extremely short and minimum equalization is required), and a gain of $(R2/R1)+(R2/Z(s))$, when the incoming signal is not as well formed (i.e., the coaxial cable is not short and equalization is required), where $Z(s)$ is the impedance of a portion of the circuit which is a function of frequency. $Z(s)$ is chosen to provide the maximum amount of equalization required (450 ft), where the loss of a coaxial cable is given by $F(s)=0.0025 L\sqrt{f}$, where L is the cable length, and f is the frequency.

Other preferred aspects of the invention include: arranging the circuit of the variable filter such that the frequency characteristics are changed at the output of the filter, but that the amplitude and offset are not changed; and providing a pulse width detector which utilizes a first input and a delayed input in order to provide a first output which indicates when the output pulse width of the variable filter is to narrow, and a second output which indicates when the output pulse width of the variable filter is to wide.

Additional objects and advantages of the invention will become apparent to those skilled in the art upon reference to the detailed description taken in conjunction with the drawings.

DETAILED DESCRIPTION OF THE PREFERRED EMBODIMENT

Figure 1:
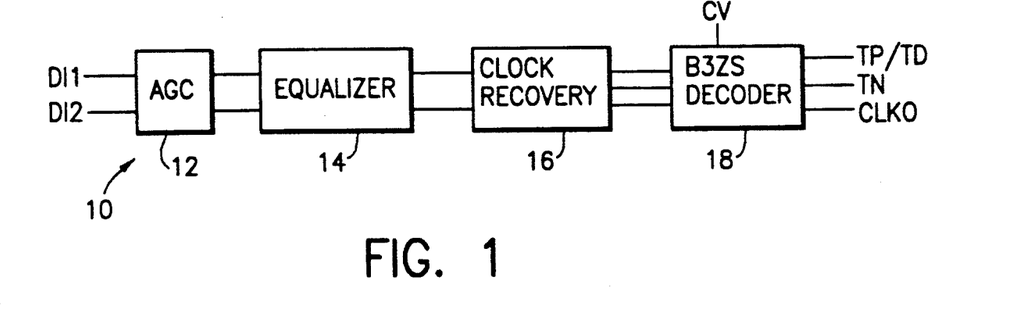
FIG. 1 is a block diagram of the receiver section of a telecommunications device in which the pulse width adaptive equalizer of the invention is incorporated.

The receive portion of a coaxial line interface device designed to recover and retransmit DS3 and STS-1 signals is seen in FIG. 1. The receive portion 10 is generally comprised of an automatic gain control (AGC) amplifier 12, an adaptive equalizer 14, a clock recovery circuit 16, and an optional standard B3ZS decoder 18. The function of the AGC amplifier 12 is to provide a linear transfer function with respect to the input voltage. In particular, a 20 dB amplifier is preferably used to gain the signal to a nominal level of 0.6 V peak-to-peak. In this manner, compensation is provided for the attenuation due to bridging, and if the received signal level is low due to the transmitting level being low (but within standards), the signal may be amplified. As will be described in more detail hereinafter with reference to FIGS. 2-4, the function of the adaptive equalizer 14 is to correct for frequency dependent attenuation which results from the transmission of the DS3 or STS-1 telecommunication signal over a coaxial cable. Preferably, and as discussed hereinafter with reference to FIG. 4, the adaptive equalizer is provided with means for additionally boosting the signal so that the net function of the adaptive equalizer is to correct for frequency dependent attenuation without otherwise affecting DC amplitude and offset. The clock recovery circuit 16 preferably includes a phase locked loop (PLL) (not shown) which is used to recover the signal from the outputs of the equalizer.

Figure 2:
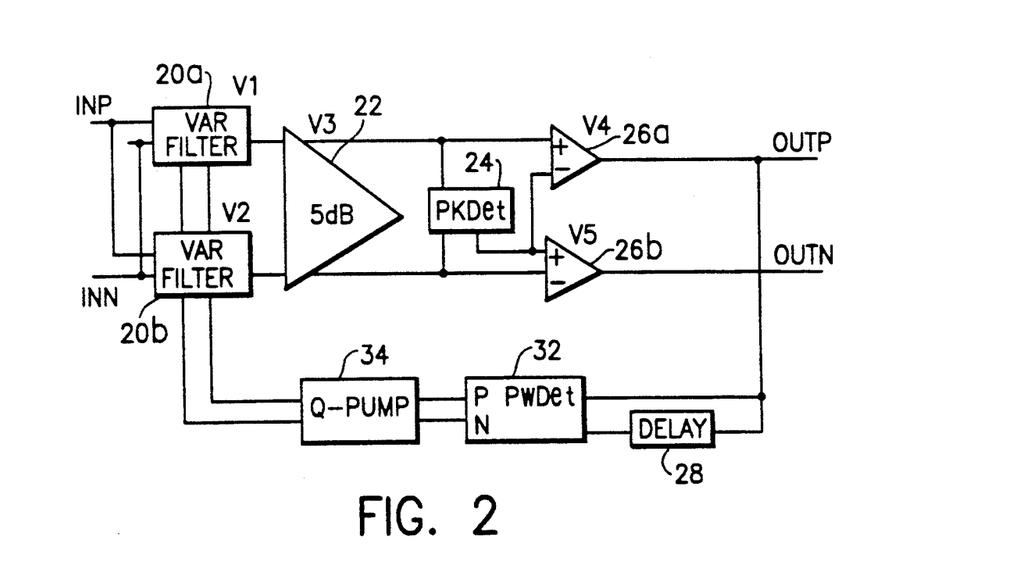
FIG. 2 is a block diagram of the pulse width adaptive equalizer of the invention.

Turning to FIG. 2, the preferred pulse width controlled adaptive equalizer 14 of the invention is seen. The adaptive equalizer 14 preferably includes two variable filters 20a, 20b, an amplifier 22, a peak detector 24, comparators 26a, 26b, a delay block 28, a pulse width detector 32, and a charge pump block 34. More particularly, for telecommunication signals such as DS3 and STS-1 signals, differential signals 42a, 42b (INP and INN) are provided to variable filters 20a and 20b, where the differential signal provided to one variable filter is the opposite in polarity to the differential signal provided to the other variable filter. Regardless, the function of the variable filters, as described above, is to filter the input signals so as to provide a frequency dependent gain based on the amplitude of control signals received from the charge pumps 34. The filtered output of the variable filters are fed to an amplifier 22 which boost them by 5 dB, and the so-boosted signals are analyzed by peak detector 24 to find the peak values of the signals. The boosted signals are then compared at comparators 26a and 26b to reference voltages which are provided by the peak detector 24, and which preferably are chosen to be approximately one-half the peak level of the boosted signal output. The comparators generate CMOS level signals which provide positive and negative pulses respectively, and these pulses are fed forward to the clock recovery circuit mentioned above with reference to FIG. 1.

At least one of the pulsed signals generated by the comparators 26a and 26b is also used to generate a feedback signal. As seen in FIG. 2, the ouptut of comparator 26a is fed both to a delay block 28 and to a pulse width detector circuit 32, which also receives the output of the delay block 28. As discussed below with reference to FIG. 5, the pulse width detector circuit compares the previous, delayed pulse signal with the present output pulse signal in order to determine whether the pulse width is narrowing or widening. If the pulse width is narrowing, the pulse width detector outputs a first signal, and if the pulse width is widening it outputs a second signal. These signals are separately input into the charge pump block 34 which is comprised of a charge pump described in more detail with reference to FIG. 6. The charge pump block 34 acts to integrate the signals output by the pulse width detector, thereby filtering the signals and providing voltage feedback signals to transistors of the variable filters. The voltage feedback signals, in turn, affect the functioning of the variable filters in order to tune the filters and provide desired filter outputs.

Figure 3:
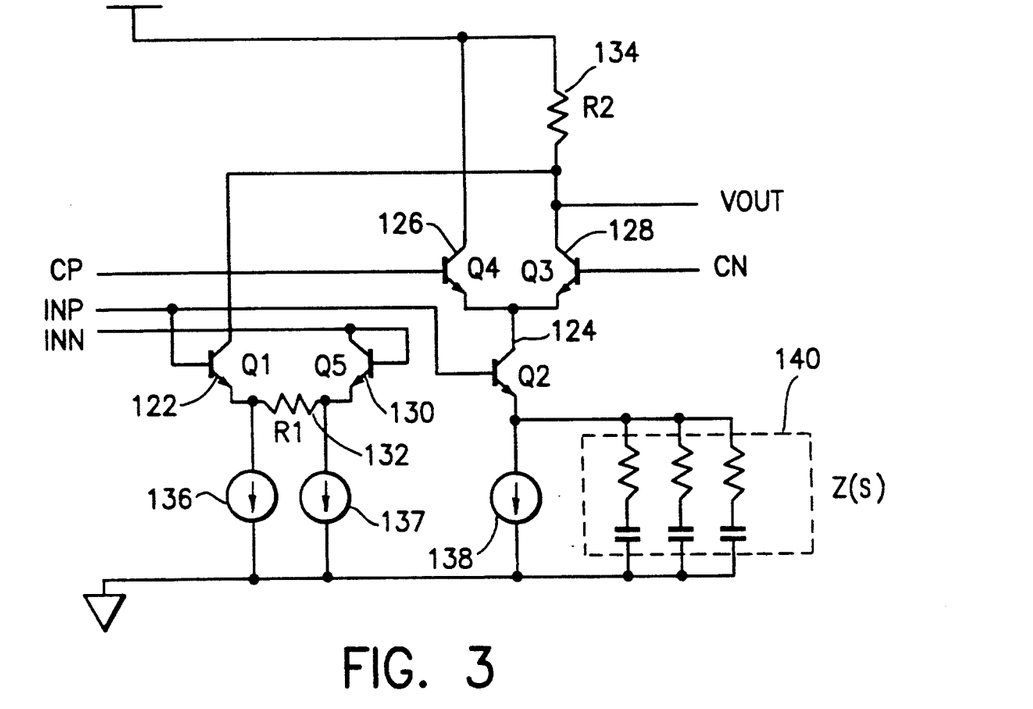
FIG. 3 is a circuit diagram of a first embodiment of the variable filter of the adaptive equalizer of FIG. 2.

A first embodiment of a variable filter for use in the pulse width controlled adaptive equalizer of the invention is seen in FIG. 3. The provided variable filter 120a (which can be used as variable filter 20a or 20b of FIG. 2) includes five bipolar transistors 122 (Q1), 124 (Q2), 126 (Q4), 128 (Q3), 130 (Q5), two resistors 132 (R1), 134 (R2), three current sources 136, 137, 138, and an RC network 140 having impedance $Z(s)$. The feedback signals (CP and CN) from the charge pumps of the charge pump block 34 are provided to the respective bases of transistors Q4 and Q3 which have common emitters. The collector of transistor Q4 is coupled to the high voltage rail, while the collector of transistor Q3 is coupled to the high voltage rail by resistor R2. The voltage output of the variable filter is also taken at the collector of transistor Q3.

The common emitters of transistors Q3 and Q4 are coupled to the collector of transistor Q2. The emitter of transistor Q2 is coupled to a current source 138 and to the RC network 140 which is in parallel with current source 138. The base of transistor Q2 receives the input signal (INP) being provided to the variable filter by the AGC (see FIG. 1). The input signal (INP) is also fed to the base of transistor Q1, while the second input signal (INN) is fed to the base of transistor Q5. The collector of transistor Q1 is coupled to (common with) the collector of transistor Q3, and the emitter of transistor Q1 is coupled to ground via current source 136. The collector of transistor Q5 is coupled to the high voltage rail, and the emitter of transistor Q5 is coupled to ground via current source 137. The emitters of transistors Q1 and Q5 are also coupled to each other via resistor R1.

With the variable filter 120a as described, when the feedback signal CP fed to the base of transistor Q4 is much larger than the feedback signal CN fed to the base of transistor Q3, little current will flow through transistor Q3. As a result, the voltage at the output of the variable filter (VOUT) is dictated by the differential amplifier comprised by transistors Q1, Q5, and resistors R2 and R1, and is effectively equal to the resistance value ratio R2/R1. This corresponds to a minimum (i.e., zero) of equalization. On the other hand, when the feedback signal CN is much larger than the feedback signal CP, there will be little current flow through transistor Q4. As a result, current will flow from the high voltage rail through resistor R2, and then in parallel through the differential amplifier and through Q3, Q2, and the RC network 140. As a result, the transfer function of the variable filter becomes (R2/R1)+(R2/Z(s)). Z(s) is therefore chosen so that this equation provides the maximum amount of equalization required; i.e., when the coaxial cable is 450 feet long.

When the feedback signal CP is close in value to the feedback signal CN, the contribution of Z(s) will vary linearly with the gain of the differential amplifier (which includes transistors Q1 and Q5) and transistor Q2.

While the circuit of FIG. 3 functions well as a variable filter in the feedback loop in order to automatically equalize for whatever length coaxial cable is provided, one drawback of the circuit is that as the amount of equalization is changed, the output level and DC operating point also changes. Compensation for this change may be made on the output of the circuit by providing an additional amplifier and offset correcting circuit. Preferably, however, and as shown in the preferred circuit of FIG. 4, the compensation is provided in the circuit by automatically adjusting the amount of current that reaches resistor R2 as the amount of equalization is changed.

Figure 4:
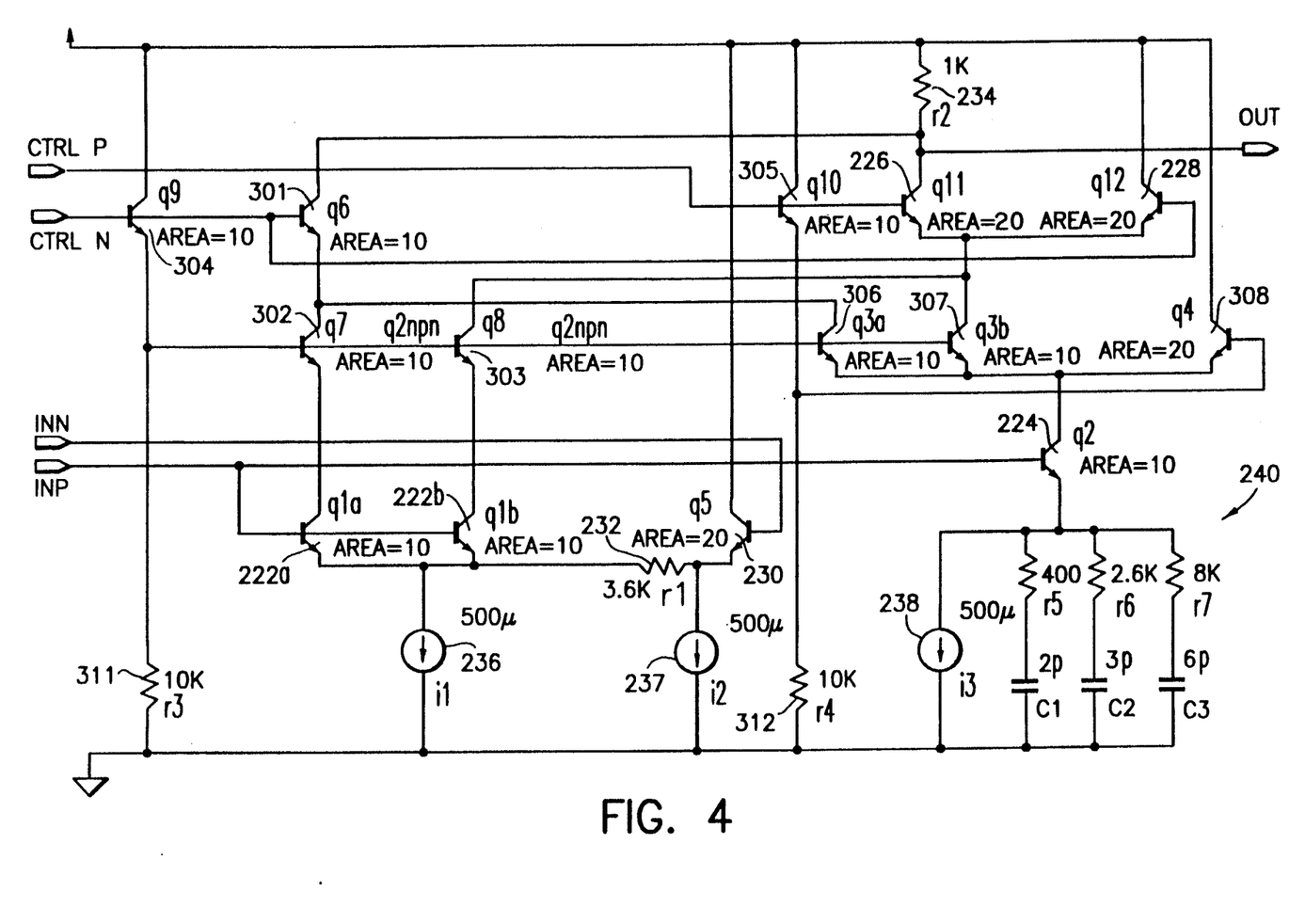
FIG. 4 is a circuit diagram of a preferred second embodiment of the variable filter of the adaptive equalizer of FIG. 2.

Turning to FIG. 4, a second and preferred variable filter 220a is shown. The preferred variable filter 220a (which can be used as variable filter 20a or 20b of FIG. 2) includes fourteen bipolar transistors 222a (q1a), 222b (q1b), 224 (q2), 226a (q3a), 226b (qcb) 228 (q4), 230 (q5), 301 (q6), 302 (q7), 303 (q8), 304 (q9), 305 (q10), 306 (q11), and 307 (q12), four resistors 232 (r1), 234 (r2), 311 (r3), and 312 (r4), three current sources 236, 237, 238, and an RC network 240 having impedance z(s). The feedback signals (CP and CN) from the charge pumps of the charge pump block 34 are provided to the respective bases of transistors q11 and q12 which have common emitters. The common emitters of transistors q11 and q12 are coupled to the collector of transistor q3b. The collector of transistor q12 is coupled to the high voltage rail, and the collector of transistor q11 is coupled to the high voltage rail via resistor 234. The collector of transistor q11 is taken as the output of the circuit.

Transistors q3a and q3b have common emitters and common bases. The common bases of transistors q3a and q3b are coupled via the emitter of transistor q9 to the feedback signal CN. The common emitters of transistors q3a and q3b are coupled to the emitter of transistor q4 and to the collector of transistor q2. Transistor q4 has its collector coupled to the high voltage rail, and its base coupled to the emitter of transistor q10. Transistor q10 has its collector coupled to the high voltage rail, its base coupled to the feedback signal CP, and its emitter coupled to the low voltage rail via resistor 312.

As aforementioned, the collector of transistor q2 is coupled to the common emitters of transistors q3a, q3b, and q4. The emitter of transistor q2 is coupled to a current source 238, and to the RC network 240. The base of transistor q2 receives the input signal (INP) being provided to the variable filter by the AGC (see FIG. 1). The input signal (INP) is also fed to the base of transistors q1a and q1b, while the second input signal (INN) is fed to the base of transistor q5. The collector of transistor q1a is coupled to the collector of transistor q3a via transistors q7, while the collector of transistor q1b is coupled to the collector of q3b via transistor q8. The common emitters of transistor q1a and q1b are coupled to ground via current source 236. The collector of transistor q5 is coupled to the high voltage rail, and the emitter of transistor q5 is coupled to ground via current source 237. The common emitters of transistors q1a and q1b are also coupled to the emitter of transistor q5 via resistor r1.

Beyond the elements that the variable filter circuit of FIG. 4 has in common with the variable filter circuit of FIG. 3, are transistors q6–q12, and resistors 311 and 312. Transistor q6 has its collector coupled to the high voltage rail Via resistor r2, its emitter coupled to the collectors of transistors q7 and q3a, and its base coupled to the control input CN (and the bases of transistors q9 and q12). Transistor q9 is provided with its collector coupled to the high voltage rail, its base coupled to the control feedback input CN (and the bases of transistors q6 and q12), and its emitter coupled to ground via resistor 311. Also coupled to the emitter of transistor q9 are the bases of transistors q7, q8, q3a and q3b. Transistor q7 has its emitter coupled to the collector of transistor q1a, and its collector coupled to the emitter of transistor q6. Transistor q8 has its emitter coupled to the collector of transistor q1b, and its collector coupled to the common emitters of transistors q11 and q12. The connections of the transistors q10, q11, and q12 are as aforementioned.

Preferably, all of the transistors of the circuit of FIG. 4 are npn transistors with sizes as noted in FIG. 4. Also, preferably, the resistors have resistances as noted in FIG. 4, and the current sources are 500 microampere current sources (nominal). The preferred RC impedance network 240 includes three resistors and three capacitors, with three parallel sets of series resistors and capacitors (r5 and c1; r6 and c2; and r7 and c3) coupling the emitter of transistor q2 to ground. To equalize a four hundred fifty foot AT&T 734A cable or equivalent, the preferred resistances and capacitances of the resistors r3, r4, and r5, and capacitors c1, c2, and c3 are as noted in FIG. 4.

With the circuit provided in FIG. 4, not only will the gain at the output be equal to r2/r1 when CP is much larger than CN, and equal to (r2/r1)+(r2/z(s)) when CN is much larger than CP, but the circuit also automatically adjusts the amount of current that reaches resistor r2 as the amount of equalization is changed. In this manner no amplifier or offset correcting circuit is required at the output of the variable filter circuit. In particular, in the circuit of FIG. 4, the currents from transistor q2 and the differential transistor pair comprised of transistors q1A/q1B and q5 are split into two paths in order to provide a mechanism of amplitude stabilization of the output signal VOUT. When CP is much larger than CN, transistor q4 is turned on and transistors q3a and q3b are turned off. Thus, any current in the RC network 240 is in a current path from Vcc-q4-q2-RC network, and the RC network does not affect the output voltage of the circuit; i.e., the gain is not frequency dependent. On the other hand, the output voltage of the circuit is controlled by two other current paths: Vcc-r2-q6-q7-q1a-current source 236; and Vcc-r2-q11-q8-q1b-current source 236. The gain of the circuit is (Vinp−Vinn) (r2/r1), and the output voltage of the circuit with a current source of five hundred microamps is equal to Vcc−(R2 500 μamps).

When CN is much greater than CP, transistor q4 is turned off, and transistors q3a and q3b are turned on. In addition, transistor q11 is turned off, and transistotor q12 is turned on. As a result, four current paths of import are established: Vcc-q12-q3b-q2-RCnetwork 240; Vcc-r2-q6-q3a-q2-RCnetwork 240; Vcc-r2-q6-q7-q1a-current source 236; and Vcc-q12-q8-q1b-current source 236. Since five hundred microamps are going through transistor q2, and transistors q3a and q3b have common bases and emitters, two hundred fifty of the microamps go through transistor q3a and two hundred fifty through transistor q3b. The two hundred fifty microamps going through transistor q3b are part of the Vcc-q12-q3b-q2-RCnetwork 240 path and do not affect the output voltage. However, the two hundred fifty microamps going through transistor q3a are part of the Vcc-r2-q6-q3a-q2-RCnetwork 240 current path, and hence the voltage at the circuit output becomes frequency dependent based on the frequency and the RC network 240. It is also noted that the current path Vcc-r2-q6-q7-q1a-current source 236 affects the voltage at the circuit output, as of the five hundred microamps at current source 236, half flows along the current path q1a-q7-q6-r2-Vcc (thereby affecting the voltage output), while the other half flows along current path q1b-q8-q12-Vcc. As a result, the frequency dependent gain of the circuit when CN is much greater than CP is 0.5 ((r2/r1)+(r2/Z(s))) which corresponds to maximum equalization of the input signal, while the DC level of the output signal is Vcc−(r2 500 μamps). The DC level of the output signal is seen to be exactly the same as when CP was much greater than CN, as half of the current through r2 is bein supplied by transistor q1a, while the other half is being supplied by transistor q3a.

It will be appreciated by those skilled in the art that the 0.5 term of the gain equation compensates for the increase in level that would occur without amplitude equalization due to the effect of an equalizing filter designed to equalize four hundred fifty feet of cable loss; approximately 5 DB at DS3 and STS1 data rates. It will also be appreciated that for other relative values of CP and CN, the amplitude and offsets will not change since the differential transistor pair q11 and q12 will compensate for the additional current from transistors q3b and q1b in direct proportion to their increase, as the sizes of these transistors are chosen appropriately. It further should be appreciated that it is not necessary for the filter to compensate perfectly for amplitude changes since the reference level of comparators V4 and V5 of FIG. 2 is derived from the actual peak level of the equalized signal and not by some fixed value.

Figure 5:
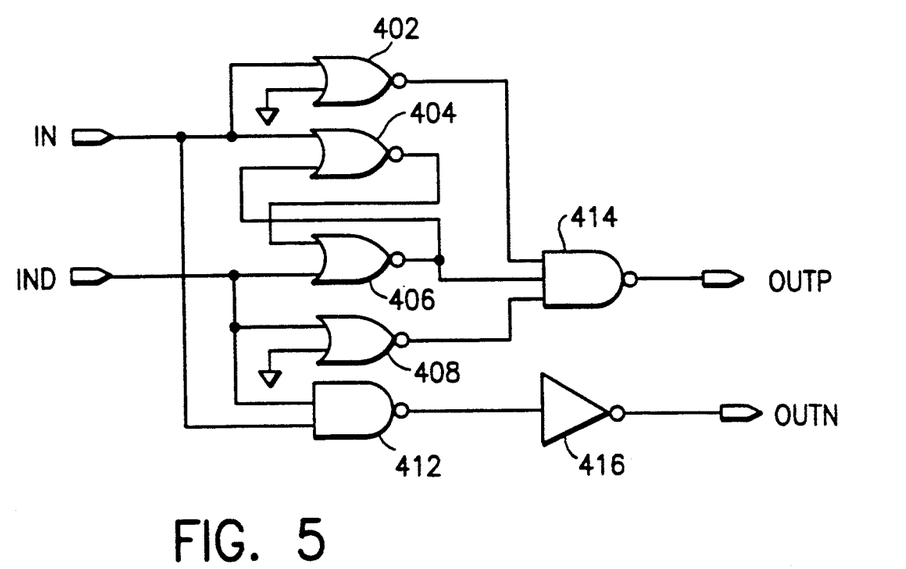
FIG. 5 is a logic diagram of the pulse width detector of the adaptive equalizer of FIG. 2.

Turning to FIG. 5, a logic diagram of the preferred pulse width detector 32 used in the adaptive equalizer 14 of FIG. 2 is seen. The preferred pulse width detector 32 includes four NOR gates 402, 404, 406, and 408, two NAND gates 412, and 414, and an inverter 416. The current input (in) is fed as a first input to NOR gates 402 and 404, and to NAND gate 412, while the delayed input (previous input ind) which is one half cycle out of phase with the current input is fed as a first input to NOR gates 406 and 408, and a second input to NAND gate 412. By having both the in and ind signals as inputs to NAND gate 412, the NAND gate 412 determines whether there is any overlap between the signals. If there is no overlap, the output of NAND gate 412 is always high, and inverter 416 inverts the signal to provide a low outn signal. On the other hand, if there is some overlap (i.e., the pulse width is too wide), the inputs to NAND gate 412 will both be high for a period of time, and the output of NAND gate 412 goes low during the overlap period of time. Since the output of NAND gate 412 is inverted by inverter 416, a high output signal is provided at outn for that period of time and indicates that the pulse width at the output of the comparator 26a or 26b (and hence out of the variable filter 20) is too wide. The width of the pulsed signal at outn is indicative of how much wider the incoming pulse is than desired.

In order to provide a signal indicating that the pulse width is too narrow, NOR gates 402, 404, 406, and 408, and three input NAND gate 414 are provided. NOR gate 402 acts as an inverter for the in signal, and provides its output as a first input to the three input NAND gate 414, while NOR gate 408 acts as an inverter for the ind signal, and provides its output as a second input to the three input NAND gate 414. NOR gates 404 and 406 are set up as an S-R flip-flop, with the output of NOR gate 404 being provided as the second input to NOR gate 406, and the output of NOR gate 406 being provided as a second input to NOR gate 404. The inverse output of the S-R flip-flop is provided as the third input to NAND gate 414. With the provided arrangement, if the in and ind signals overlap or provide no gap, then, one of the signals provided to three input NAND gate 414 will always be low, and NAND gate will provide a high output. However, if the in signal is too narrow and a gap is provided, then during the gap the inputs from NOR gate 402 and NOR gate 408 will both be high, and the inverse output of the S-R flip-flop will also be high. This result causes the three input NAND gate to provide a low output at outp. Thus, a low output pulse from three input NAND gate 414 is indicative that the variable filter 20 is providing a pulse which is too narrow, and the width of the low output pulse is indicative of how much narrower the incoming pulse is than desired.

As aforementioned with reference to FIG. 2, the outp and outn signals from the pulse width detector 32 are fed to charge pump integrator block 34 (as inp and inn signals). A preferred embodiment of the charge pump of the charge pump integrator block 34 is seen in FIG. 6.

Figure 6:
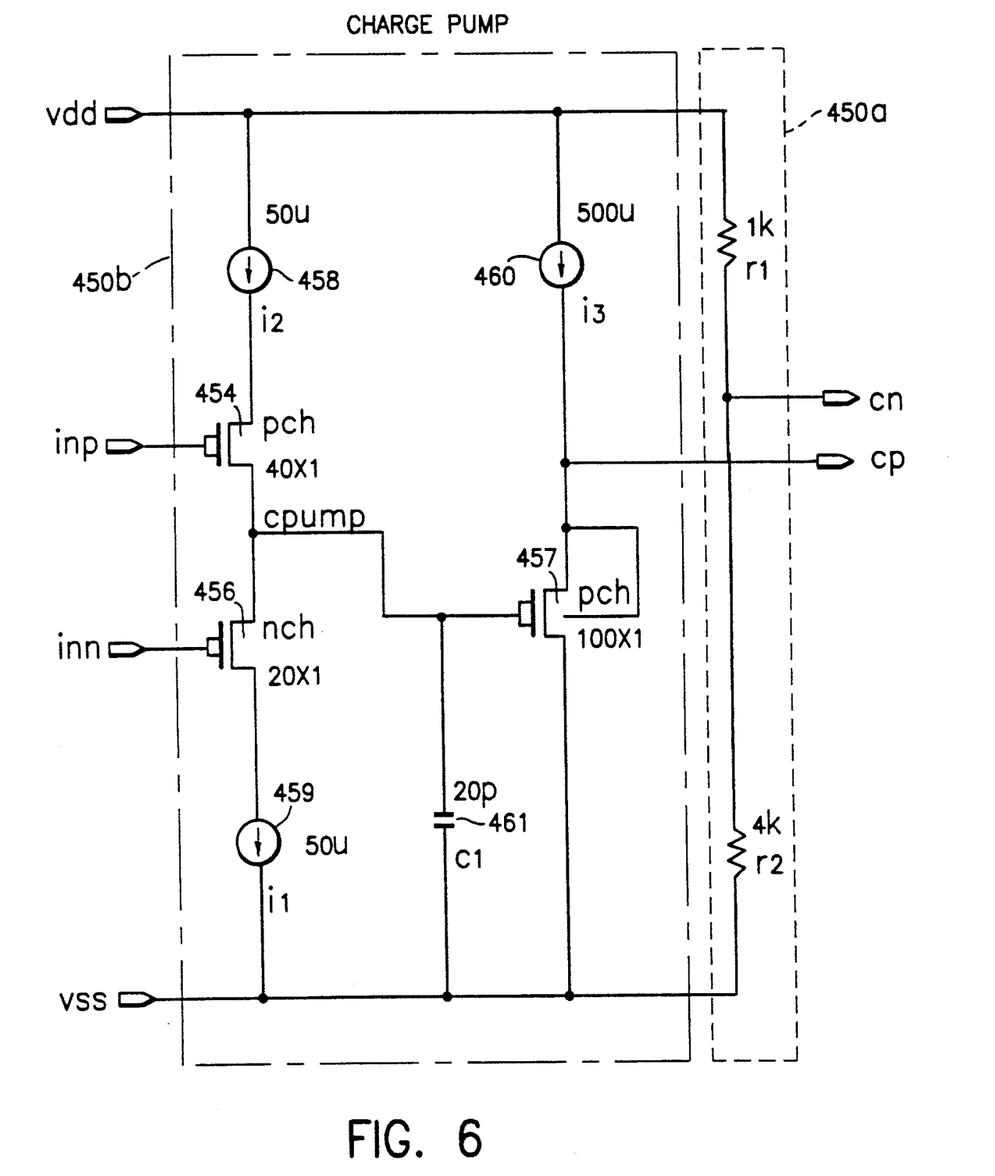
FIG. 6 is a circuit diagram of the charge pump of the adaptive equalizer of FIG. 2.

As seen in FIG. 6, the charge pump includes a reference voltage block 450a and a varying voltage block 450b. The reference voltage block 450a is comprised of a voltage divider having resistors 452 and 454 which divide down the high voltage source Vdd. The CN output of the charge pump is taken as the output of the voltage divider.

The varying voltage block 450b is preferably comprised of three MOSFETs 454, 456, and 457, with transistor 457 being a source follower, three current sources 458, 459, 460, and a capacitor 461. The outp signal from the pulse width detector which indicates too narrow a pulse is fed as a first input signal into block 450b, and is fed as signal inp to the gate of p-channel FET 454. The source of transistor 454 is coupled to the high voltage rail Vdd via current source 454. The drain of transistor 454 is coupled to the gate of the p-channel source follower transistor 457 which has its source coupled to its gate and its drain coupled to the low voltage rail Vss. The source of p-channel FET 457 is coupled to the high voltage rail VDD via current source 460, and the CP output of the charge pump is taken from the source and bulk of the p-channel FET 457.

The drain of transistor 454 is further coupled to the source of n-channel FET 456 and to a first plate of capacitor 460. The second plate of capacitor 460 is coupled to low voltage rail (Vss). The gate of n-channel FET 456 receives the outn signal of the pulse width detector as signal inn, and the drain of the transistor 456 is coupled to the low voltage rail via current source 459. With the provided arrangement, the capacitor 460 is in parallel with the series arrangement of the transistor 456 and the current source 459.

As provided, when a outp (pulse width too narrow) signal is provided to the varying voltage block 450b as an active low inp signal, the p-channel FET 454 is turned on. When transistor 454 is turned on, charge is pumped by current source 458 to capacitor 460 which charges up. As a result, the voltage at the output CP increases. However, when an outn (pulse width too wide) signal (active high) is provided to the varying voltage block 450b, n-channel FET 456 turns on and drains charge off of capacitor 460, thereby decreasing the voltage at output CP. Thus, the output voltage CP which is fed back to the variable filter can be caused to increase and decrease based on the width of the signal originally generated by the variable filter, and can be less than or greater than reference voltage CN. Because the voltage at the output CP is dependent on the charge on the capacitor 460, the voltage at the output CP does not quickly swing dramatically. Rather, the voltage moves relatively slowly depending upon the width and regularity of the pulses received at the FET transistors 454 and 456 and based on the capacitance of capacitor 460. The charge pump thereby acts as an integrator or filter for the feedback system. The source follower FET 457 is used to provide a high impedance load to current source 460 so that charge is not lost by the capacitor 461 once the proper output voltage is reached.

There have been described and illustrated herein pulse width controlled adaptive equalizers. While particular embodiments of the invention have been described, it is not intended that the invention be limited thereby, as it is intended that the invention be as broad in scope as the art will allow. Thus, it is understood by those skilled in the art that while particular circuitry was described, other circuits for accomplishing the same or similar results can be utilized. For example, while particular logic gates which comprise a pulse width detector were described, equivalent analog circuitry or equivalent but different logic circuitry could be utilized. Similarly, while a particular charge pump integrator was described for use as a feedback filter, other filters could be utilized. Alternatively, no feedback filter need be provided. Further, while bipolar and CMOS transistors were described in conjunction with the different circuits, it will be appreciated that equivalent transistors could be utilized to create entirely CMOS or entirely bipolar circuits, or otherwise. It will also be appreciated that while two particular variable filter circuits were described, other variable filter circuits may be utilized within the scope of the invention provided that they use feedback signals as control signals for varying the overall impedance of the filter circuit and thereby correct for frequency dependent attenuation (e.g., due to the use of a coaxial cable). Further, it will be appreciated that while the invention was described with reference to a differential input embodiment, the invention also applies to embodiments where the input signal is single ended. Therefore, it will be appreciated by those skilled in the art that yet other modifications could be made to the provided invention without deviating from its spirit and scope as so claimed.

What is claimed is:

1. A pulse width controlled adaptive equilizer which equalizes an incoming signal, comprising:
   a) variable filter means for receiving a feedback control signal and said incoming signal, and for providing frequency dependent gain to said incoming signal to provide an equalized filtered pulse signal, wherein said frequency dependent gain is controlled by said feedback control signal;
   b) feedback means coupled to said variable filter means, said feedback means for receiving said filtered pulse signal, for sensing the pulse width of said equalized filtered pulse signal, and for generating and providing said feedback control signal to said filter means;
   c) peak detector means coupled to said variable filter means, said peak detector means for detecting a peak amplitude of said equalized filtered pulse signal, and for providing an output which is a function of said peak amplitude; and
   d) comparator means coupled to said peak detector means and coupled to said variable filter means, said comparator means for comparing said equalized filtered pulse signal and said output of said peak detector means, and for providing an output signal having a pulse width indicative of whether said variable filter means is properly equalizing said incoming signal, wherein said output signal is used by said feedback means for sensing the pulse width.

2. A pulse width controlled adaptive equalizer according to claim 1, wherein:
   said incoming signal is a bipolar telecommunications signal which has traveled over a coaxial cable.

3. A pulse width controlled adaptive equalizer according to claim 1, wherein:
   said feedback means comprises a pulse width detector means for receiving said output signal, and a delay means for receiving said output signal, for delaying said output signal, and for providing a delayed output signal to said pulse width detector means, wherein said pulse width detector means compares a current output signal against a delayed output signal and generates a first indication when said current output signal is narrow relative to said delayed output signal, and a second indication when said current output signal is wide relative to said delayed output signal.

4. A pulse width controlled adaptive equalizer according to claim 1, wherein:
said feedback means comprises a pulse width detector means for receiving said output signal and for generating a first indication when said output signal is too narrow and a second indication when said output signal is too wide.

5. A pulse width controlled adaptive equalizer according to claim 4, wherein:
said control signal comprises first and second control signals, and said first indication is said first control signal, and said second indication is said second control signal.

6. A pulse width controlled adaptive equalizer according to claim 4, wherein:
said feedback means further comprises a feedback filter means for receiving and filtering said first and second indications, and based on said first and second indications providing said control signal to said variable filter means.

7. A pulse width controlled adaptive equalizer according to claim 6, wherein:
said control signal comprises first and second control signals, and said feedback filter means provides a reference signal which comprises said first control signal, and a variable signal which varies according to said first and second indications and constitutes said second control signal.

8. A pulse width controlled adaptive equalizer according to claim 1, wherein:
said output of said peak amplitude detector is a signal equal to approximately one-half the peak amplitude detected.

9. A pulse width controlled adaptive equalizer according to claim 3, wherein:
said pulse width detector comprises a plurality of logic gates.

10. A pulse width controlled adaptive equalizer according to claim 9, wherein:
said plurality of logic gates comprises first and second, NOR gate means, first and second inverter means, a two-input NAND gate means, and a three-input NAND gate means, wherein
said current output signal and said delayed output signal are provided as inputs into said two-input NAND gate means which provides a signal related to said second indication, and
said current output signal is provided as a first input to said first NOR gate means and said first inverter means, and said delayed output signal is provided as a first input to said second NOR gate means and said second inverter means, and an output of said first NOR gate means is provided as a second input to said second NOR gate means, and an output of said second NOR gate means is provided as a second input to said first NOR gate means, and said output of said second NOR gate means is provided as a first input to said three-input NAND gate means, and outputs of said first and second inverter means are provided as second and third inputs to said three-input NAND gate means, wherein said three-input NAND gate means provides a signal related to said first indication.

11. A pulse width controlled adaptive equalizer according to claim 10, wherein:
said delayed output signal is one half cycle out of phase with said current output signal.

12. A pulse width controlled adaptive equalizer according to claim 10, wherein:
said plurality of logic gates further comprises a third inverter means coupled to the output of said two-input NAND gate means, wherein the output of said third inverter means is said second indication, and wherein an output of said three-input NAND gate means is said first indication.

13. A pulse width controlled adaptive equalizer which equalizes an incoming signal, comprising:
a) variable filter means for receiving a feedback control signal and said incoming signal, and for providing frequency dependent gain to said incoming signal to provide an equalized filtered pulse signal, wherein said frequency dependent gain is controlled by said feedback control signal; and
b) feedback means coupled to said variable filter means, said feedback means for receiving said filtered pulse signal, for sensing the pulse width of said equalized filtered pulse signal, and for generating and providing said feedback control signal to said filter means, wherein,
said variable filter means comprises a circuit having at least two resistors having first (R1) and second (R2) resistances and an RC network having impedance Z(s), wherein said frequency dependent gain of said variable filter means is approximately a ratio (R2/R1) of said first and second resistances when said incoming signal is well equalized, and said frequency dependent gain of said variable filter means is approximately equal to a ratio (R2/R1) of said first and second resistances plus a ratio (R2/Z(s)) of said second resistance and said impedance Z(s) when said incoming signal requires equalization.

14. A pulse width controlled adaptive equalizer according to claim 13, wherein:
said incoming signal is a bipolar telecommunications signal which has traveled over a coaxial cable of length L, and
said RC network is chosen to have said impedance Z(s) provide a maximum amount of equalization required for a 450 foot coaxial cable, where the loss of a coaxial cable is given approximately by $F(s) = 0.0025 \, L\sqrt{f}$, where f is frequency.

15. A pulse width controlled adaptive equalizer according to claim 13, wherein:
said control signal comprises a first variable control signal and a second reference control signal, and
said variable filter means further comprises a first transistor, a second transistor, a third transistor, and a fourth transistor, each of said first, second, third, and fourth transistors having a collector, an emitter, and a base, wherein
said second resistor is coupled between a first voltage rail and an output of said variable filter means,
said first transistor has its collector coupled to said second resistor, its emitter coupled to said first resistor, and its base receiving said incoming signal,
said second transistor has its base coupled to said incoming signal and its emitter coupled to said RC network, said RC network is coupled between said emitter of said second transistor and a second voltage rail, said third transistor has its collector coupled to said second resistor, its emitter coupled to said collector of said second transistor, and its base receiving said variable control signal, and said fourth transistor has its collector coupled to said first voltage rail, its emitter coupled to said emitter of said third transistor, and its base coupled to said second reference control signal.

16. A pulse width controlled adaptive equalizer according to claim 15, wherein:

said variable filter further comprises a fifth transistor having a collector coupled to said first voltage rail, an emitter coupled to said first resistor, and a base coupled to said incoming signal.

17. A pulse width controlled adaptive equalizer according to claim 16, wherein:

said variable filter further comprises a first, second, and third current sources, said first current source being coupled between said emitter of said second transistor and said second voltage rail, said second current source being coupled between said emitter of said first transistor and said second voltage rail, and said third current source being coupled between said fifth transistor and said second voltage rail.

18. A pulse width controlled adaptive equalizer according to claim 17, wherein:

said variable filter further comprises sixth, seventh, eighth, ninth, tenth, eleventh, twelvth, thirteenth, and fourteenth transistors each having collectors, emitters, and bases, with said sixth transistor having its collector coupled to said second resistor, and its base coupled to said varying control signal, said seventh transistor having its collector coupled to said emitter of said sixth trasnsitor, and its emitter coupled to said collector of said first transistor, with said sixth and seventh transistors coupling said collector of said first transistor to said second resistor, said eighth transistor having its collector coupled to said emitters of said third and fourth transistors, said ninth transistor having its collector coupled to said first voltage rail, its emitter coupled to said bases of said seventh and eighth transistors and further coupled to said second voltage rail, and its base coupled to said variable control signal, said tenth transistor having its base coupled to said reference control signal, its collector coupled to said first voltage rail, and its emitter coupled to said second voltage rail, said eleventh transistor having it collector coupled to said emitter of said sixth transistor, its base coupled to said base of said seventh and eighth transistors, and its emitter coupled to said collector of said second transistor, said twelvth transistor having its collector coupled to said emitters of said third and fourth transistors, its base coupled to said base of said eleventh transistor, and its emitter coupled to said collector of said second transistor, thereby coupling said emitters of said third and fourth transistors to said collector of said second transistor, said thirteenth transistor having its collector coupled to said first voltage rail, its base coupled to said emitter of said tenth transistor, and its emitter coupled to said emitter of said twelth transistor, and said fourteenth transistor having its base coupled to said base of said first transistor, its emitter coupled to said emitter of said first transistor, and its collector coupled to said emitter of said eighth transistor.

19. A pulse width controlled adaptive equalizer according to claim 18, wherein:

said variable filter further comprises third and fourth resistors, with said third resistor coupling said emitter of said ninth transistor to said second voltage rail, and said fourth transistor coupling said emitter of said tenth transistor to said second voltage rail.

* * * * *

UNITED STATES PATENT AND TRADEMARK OFFICE
CERTIFICATE OF CORRECTION

PATENT NO.   : 5,323,423
DATED        : June 21, 1994
INVENTOR(S)  : Jeffrey A. Townsend et al.

It is certified that error appears in the above-identified patent and that said Letters Patent is hereby corrected as shown below:

Drawings,
Figure 3, should be deleted to be replaced with the corrected Figure 3, as shown below:

FIG. 3

Signed and Sealed this

Eighteenth Day of June, 2002

Attest:

*Attesting Officer*

JAMES E. ROGAN
*Director of the United States Patent and Trademark Office*